(12) United States Patent
Szarszewski et al.

(10) Patent No.: US 9,096,306 B2
(45) Date of Patent: Aug. 4, 2015

(54) AIRCRAFT SYSTEM CARRIER ELEMENT

(75) Inventors: Maik Szarszewski, Buergstadt (DE); Christoph Weber, Biberach (DE); Joachim Voelkner, Blaubeuren/Erstetten (DE)

(73) Assignee: Airbus Operations GMBH, Hamburg (DE)

(*) Notice: Subject to any disclaimer, the term of this patent is extended or adjusted under 35 U.S.C. 154(b) by 1229 days.

(21) Appl. No.: 12/997,497

(22) PCT Filed: Jun. 9, 2009

(86) PCT No.: PCT/EP2009/004150
§ 371 (c)(1),
(2), (4) Date: May 24, 2011

(87) PCT Pub. No.: WO2009/149904
PCT Pub. Date: Dec. 17, 2009

(65) Prior Publication Data
US 2011/0226377 A1    Sep. 22, 2011

Related U.S. Application Data

(60) Provisional application No. 61/060,221, filed on Jun. 10, 2008.

(30) Foreign Application Priority Data

Jun. 10, 2008    (DE) .......................... 10 2008 027 604

(51) Int. Cl.
*B64D 13/00* (2006.01)
*B64C 1/06* (2006.01)
*B64C 1/00* (2006.01)

(52) U.S. Cl.
CPC ......... *B64C 1/066* (2013.01); *B64C 2001/0072* (2013.01); *Y02T 50/433* (2013.01)

(58) Field of Classification Search
CPC ............. H02G 3/00; H02G 3/03; H02G 3/04; H02G 3/0418; B64D 13/00; B64D 13/06; B64D 2011/0046; B64D 2013/00; F16L 9/21; B64C 1/10; B64C 1/14; B64C 1/30; B64C 1/40; B64C 1/403; B64C 1/406; B64C 1/061; B64C 1/066; B64C 2001/0072; B60H 1/00; Y02T 50/433

USPC ......... 454/71, 74, 76, 83, 103, 104, 107, 108, 454/115, 137, 142, 144, 185, 262; 296/208; 224/119
See application file for complete search history.

(56) References Cited

U.S. PATENT DOCUMENTS 2,355,629 A * 8/1944 Carrier ........................... 165/53
2,581,709 A * 1/1952 Rogers ........................ 165/121

(Continued)

FOREIGN PATENT DOCUMENTS

CN        2632904        8/2004
DE     102006050534      4/2008

(Continued)

OTHER PUBLICATIONS

State Intellectual Property Office of P. R. China, Office Action, Jun. 13, 2013 (English Language Translation, 4 pgs.) (Chinese Language 6 pgs.).

(Continued)

*Primary Examiner* — Gregory Huson
*Assistant Examiner* — Dana Tighe
(74) *Attorney, Agent, or Firm* — Wood Herron & Evans, LLP (57) ABSTRACT

An aircraft system carrier element includes a basic body made of a sound- and heat-insulating material, in which are formed an air conditioning duct, which is connectable to an aircraft air conditioning system and provided for supplying an aircraft compartment, and a line duct for receiving lines that are provided for supplying the aircraft compartment. The basic body includes a rear wall and a line duct cover that is fastened detachably to the rear wall. The detachable fastening of the line duct cover enables easy access to the lines for maintenance purposes, when necessary, while also protecting the lines against environmental effects in normal operation.

9 Claims, 6 Drawing Sheets

(56) References Cited

U.S. PATENT DOCUMENTS

| | | | |
|---|---|---|---|
| 3,482,505 A * | 12/1969 | Sawyer et al. | 454/296 |
| 3,964,377 A * | 6/1976 | Chapman | 454/353 |
| 4,101,700 A * | 7/1978 | Ray et al. | 428/131 |
| 5,556,332 A * | 9/1996 | Schumacher | 454/76 |
| 5,704,175 A * | 1/1998 | Lewis | 52/288.1 |
| 6,191,363 B1 * | 2/2001 | Samuels | 174/68.3 |
| 6,504,093 B1 * | 1/2003 | Cawley | 174/482 |
| 6,991,276 B2 * | 1/2006 | McCauley et al. | 296/37.7 |
| 2002/0145236 A1 | 10/2002 | Wandyez | |
| 2004/0174044 A1 * | 9/2004 | Nicolier et al. | 296/181.1 |
| 2005/0044712 A1 * | 3/2005 | Gideon et al. | 29/897.32 |
| 2006/0261223 A1 * | 11/2006 | Orndorff et al. | 248/220.1 |
| 2007/0139941 A1 * | 6/2007 | Bryan et al. | 362/470 |

FOREIGN PATENT DOCUMENTS

| | | |
|---|---|---|
| EP | 1510454 | 3/2005 |
| GB | 2272749 | 5/1994 |
| WO | 2008022752 | 2/2008 |

OTHER PUBLICATIONS

European Patent Office, International Search Report, PCT/EP2009/004150, Form PCT/ISA/210, PCT/ISA/237, Feb. 23, 2010.

* cited by examiner

FIG 6

AIRCRAFT SYSTEM CARRIER ELEMENT

This application claims priority to PCT Application No. PCT/EP2009/004150, filed on Jun. 9, 2009, under Section 371 and/or as a continuation under Section 120, which claims priority to German Application No. 10 2008 027 604.9 and U.S. Provisional Application No. 61/060,221, both filed on Jun. 10, 2008.

TECHNICAL FIELD

The invention relates to a system carrier element that is provided for use in an aircraft both to mount lines needed to supply an aircraft compartment and as aircraft compartment insulation.

BACKGROUND

System lines, such as for example electric lines, oxygen lines or pipes of the air conditioning system, that are needed to supply an aircraft compartment, for example a crew rest compartment, are currently conventionally fastened with the aid of so-called inserts to the outer surfaces of the aircraft compartment walls. For this purpose the inserts, which are generally made of metal and provided with an internal thread, are disposed individually in corresponding receivers that are formed in the panels forming the aircraft compartment walls. The inserts may then be used to screw-fasten to the panels suitable fastening devices for fastening the system lines to the panels forming the aircraft compartment walls.

The sound insulation of the aircraft compartment is conventionally effected with the aid of so-called heavy foils which, prior to mounting of the fastening devices for fastening the system lines to the panels forming the aircraft compartment walls, are glued in a separate operation onto the outer surfaces of the panels forming the aircraft compartment walls. The heat insulation of the aircraft compartment is finally realized by means of glass wool packs, which are mounted likewise in a separate operation on the panels forming the aircraft compartment walls and having the system lines fastened thereto.

A substantial drawback of fastening the system lines with the aid of inserts is that the positioning of the inserts is usually effected in a customized manner. Consequently, panels and insert layouts that are individually designed for each customer have to be generated. Furthermore, the system lines mounted on the outer surfaces of the panels forming the aircraft compartment walls are relatively unprotected. Electric supply lines and oxygen lines therefore often have to be installed in the interior of the compartment and provided with appropriate protective covers, this complicating and slowing down the mounting and maintenance of the lines. Finally, mounting the sound- and heat insulation of the aircraft compartment in separate operations is very time-consuming and therefore costly.

The underlying object of the present invention is to provide an aircraft system carrier element that enables easy and rapid mounting of lines needed to supply an aircraft compartment and of aircraft compartment insulation.

SUMMARY OF THE INVENTION

In order to achieve this object, an aircraft system carrier element according to the invention comprises a basic body made of a sound- and heat-insulating material. Formed in the basic body is an air conditioning duct, which is connectable to an, which is connectable to an aircraft air conditioning system and is provided for supplying an aircraft compartment, and a line duct for receiving lines provided for supplying aircraft compartments. The aircraft system carrier according to the invention therefore not only comprises an integrated air conditioning duct and a line duct for receiving the system lines needed to supply the aircraft compartment but also functions as sound- and heat insulation for the aircraft compartment. In order to achieve optimum sound- and heat insulation, the aircraft system carrier element according to the invention is preferably mounted on an outer surface of an aircraft compartment wall. In the basic body of the aircraft system carrier element according to the invention only one air conditioning duct and only one line duct may be formed. Alternatively thereto, it is however also conceivable to provide a plurality of air conditioning ducts and/or a plurality of line ducts in the basic body. It is further conceivable to subdivide the air conditioning duct and/or the line duct into mutually separate portions.

A substantial advantage of the system carrier element according to the invention is that there is no longer any need to fasten the system lines for supplying the aircraft compartment individually with the aid of inserts, which are to be individually positioned, to a panel forming an aircraft compartment wall. Instead, the aircraft system carrier element may first be preassembled with the lines provided for supplying the aircraft compartment to form an assembly capable of independent handling and then be fastened to a panel forming an aircraft compartment wall. The number of connection points, which are to be provided on a panel forming an aircraft compartment wall and may take the form of inserts or other suitable mounting devices, may therefore be considerably reduced. Furthermore, given the use of a standardized aircraft system carrier element, on a panel forming an aircraft compartment side wall all that is required for fastening the aircraft system carrier element to the panel is to provide suitable connection points at standardized positions. As a result, the wide variety of panels used to form aircraft compartment walls may be considerably reduced.

A further advantage of the aircraft system carrier element according to the invention is that through the use of the aircraft system carrier element, it is possible to dispense with separate sound- and heat insulation to the aircraft compartment. Furthermore, the system lines accommodated in the line duct are well protected against external effects. It is therefore no longer necessary for sensitive system lines, such as for example electric lines or oxygen lines, to be installed in the interior of the aircraft compartment and provided with separate covers. By virtue of the system carrier element according to the invention the mounting of the sound- and heat insulation of the aircraft compartment and the mounting of the system lines needed to supply the aircraft compartment may consequently be simplified to a considerable extent.

The aircraft system carrier element according to the invention may be used for example in connection with a crew rest compartment. As a crew rest compartment has to be air-conditioned with the aid of the aircraft air conditioning system and a large number of system lines, such as for example electric lines and oxygen lines, is moreover needed to supply the crew rest compartment, the aircraft system carrier element according to the invention may in a particularly advantageous manner considerably simplify the mounting of these components. The system carrier element according to the invention moreover provides the desired sound- and heat insulation of the crew rest compartment. The aircraft system carrier element according to the invention may however also be used in connection with other aircraft compartments that may be disposed in an upper or underfloor region of the aircraft, but also in the region of an aircraft passenger cabin.

The basic body of the aircraft system carrier element according to the invention is made preferably of a sound- and heat-insulating foam. The foam material of the basic body may be selected application-specifically as a function of the required sound- and heat-insulating properties of the aircraft system carrier element. When choosing a foam material suitable for manufacturing the basic body of the aircraft system carrier element according to the invention it is however necessary to take account of the high safety requirements that apply to aircraft construction. In particular, a foam material suitable for manufacturing the basic body of the aircraft system carrier element according to the invention is required to be extremely fire-resistant and to lead in the event of fire to only a low development of smoke. For example, the basic body of the aircraft system carrier element according to the invention may be manufactured from a PU (polyurethane), a PF (phenolic resin) or a PMI (polymethacrylimide) foam material or from a wood material, such as for example Baltek®. Besides its good sound- and heat-insulating effect, a basic body made of a foam material is notable for its low weight.

The basic body of the aircraft system carrier element according to the invention may be of a multi-part construction and preferably comprises a rear wall, which is provided for being fastened to an outer surface of an aircraft compartment wall, i.e. to an outer surface of a panel forming the aircraft compartment wall or to outer surfaces of a plurality of panels forming the aircraft compartment wall. The basic body of the aircraft system carrier element according to the invention may further comprise a line duct cover that is fastened detachably to the rear wall. A line duct cover fastened detachably to the rear wall allows rapid access to the system lines accommodated in the line duct, thereby considerably simplifying the maintenance of these lines.

The basic body may further comprise an air-conditioning duct cover that is connectable to the rear wall. Preferably both the rear wall and the air-conditioning duct cover are provided with suitable adhesive surfaces so that the air-conditioning duct cover may be glued in a simple and convenient manner to the rear wall. A three-part basic body comprising a rear wall, a line duct cover and an air-conditioning duct cover is relatively easy to manufacture. Alternatively thereto, the basic body may however also be of a single- or two-part construction. In particular, a component forming the rear wall and the air-conditioning duct cover of the basic body may be of a single-part construction.

In the rear wall of the basic body preferably at least one leadthrough is formed for leading a line provided for supplying the aircraft compartment out of the aircraft system carrier element into the aircraft compartment. The leadthrough is situated preferably in the region of the line duct formed in the basic body. Where desired or necessary, a suitable element for sealing the leadthrough may be disposed in the region of the leadthrough. In the mounted state of the aircraft system carrier element according to the invention on an aircraft compartment wall, leadthroughs formed in the rear wall of the basic body of the aircraft system carrier element are preferably flush with corresponding leadthroughs that are provided in the aircraft compartment wall.

To prevent impairment of an air flow through the air conditioning duct formed in the basic body of the aircraft system carrier element according to the invention, an inner surface of the air conditioning duct preferably has a surface roughness that does not exceed a predetermined value. In order to realize a desired low surface roughness, the inner surface of the air conditioning duct may be appropriately surface-machined or provided with a coating. A coating applied to an inner surface of the air conditioning duct may also be used to seal the air conditioning duct, this possibly being advantageous particularly if the basic body is made of a porous foam material. However, as an alternative to this, a thin-walled pipe for example of a plastics material may also be integrated into the air conditioning duct.

A plurality of different system lines may be led through the line duct formed in the basic body of the aircraft system carrier element according to the invention. For safety reasons it is however necessary to install specific lines, such as for example electric lines or oxygen lines, at a specific distance from other lines. In the line duct, therefore, a plurality of receivers for mounting line-fastening devices are preferably disposed, which are used to mount in the line duct suitable devices for fastening the lines led through the line duct. The receivers may for example be made of a plastics material and be shaped and dimensioned in such a way as to allow the lines led through the line duct to be installed at a desired distance from one another.

As already mentioned, the aircraft system carrier element according to the invention is provided for mounting on an outer surface of an aircraft compartment wall. Aircraft compartments are conventionally fastened with the aid of appropriate holders to an aircraft structure. The holders conventionally extend from the aircraft compartment walls towards the aircraft structure. In order not to impede the mounting of the aircraft compartment on the aircraft structure, in the basic body of the aircraft system carrier element according to the invention at least one cutout is therefore formed for receiving a holder for fastening the aircraft compartment to the aircraft structure. For example, the rear wall of the basic body may be provided with a cutout or a plurality of cutouts, through which in the mounted state of the aircraft system carrier element on an aircraft compartment wall a holder or a plurality of holders for fastening the aircraft compartment to the aircraft structure extends/extend. However, as an alternative or in addition thereto, a component of the basic body that lies opposite the rear wall, i.e. the line duct cover and/or the air-conditioning duct cover, may be provided with a cutout or a plurality of cutouts for receiving a holder or a plurality of holders for fastening the aircraft compartment to the aircraft structure.

The aircraft system carrier element according to the invention may further comprise a side wall that is connected to the basic body in the region of the line duct and provided with appropriate leadthroughs for leading the lines provided for supplying the aircraft compartment into the line duct and/or out of the line duct. Preferably the aircraft system carrier element comprises two side walls that close the line duct on both sides. The side wall or the side walls may be integrated in the basic body or take the form of a separate component/separate components. A line duct provided with side walls offers particularly good protection against external influences to the lines installed in the line duct.

The size and the shape of the aircraft system carrier element according to the invention are preferably adapted to the size and the shape of an aircraft compartment side wall, on which the aircraft system carrier element is to be mounted. For example, the aircraft system carrier element may extend over a large area of an aircraft compartment side wall. As an alternative to this, it is however also conceivable to dispose a plurality of aircraft system carrier elements according to the invention successively along a side wall of an aircraft compartment.

BRIEF DESCRIPTION OF THE DRAWINGS

There now follows a detailed description of a preferred embodiment of an aircraft system carrier element according to the invention with reference to the following schematic drawings, which show FIG. 1 a three-dimensional representation of a rear wall of a basic body of an aircraft system carrier element, FIG. 2 a plan view of the rear wall of the basic body of the aircraft system carrier element according to FIG. 1, FIG. 3 a three-dimensional representation of a basic body of an aircraft system carrier element with a rear wall and an air-conditioning duct cover, FIG. 4 a three-dimensional representation of an aircraft system carrier element having a basic body that comprises a rear wall, an air-conditioning duct cover and a line duct cover, FIG. 5 a three-dimensional representation of an aircraft system carrier element according to FIG. 4 in the mounted state on an aircraft compartment wall, and FIG. 6 a further three-dimensional representation of the aircraft system carrier element according to FIG. 4 in the mounted state on an aircraft compartment wall.

DETAILED DESCRIPTION

An aircraft system carrier element 10 shown in the figures comprises a basic body 12, which is made of a sound- and heat-insulating foam, such as for example PU foam, PF foam or PMI foam, or of a wood material, such as for example Baltek®. The basic body 12 comprises a rear wall 13, which comprises a half-shell of an air conditioning duct 14 and a half-shell of a line duct 16.

In order to form the air conditioning duct 14, which has an oval cross section, the rear wall 13 is glued to an air-conditioning duct cover 18. An inner surface of the air conditioning duct 14 is provided with a coating to guarantee that the surface roughness of the inner surface of the air conditioning duct does not exceed a predetermined value. During operation of the air conditioning duct 14, i.e. when the air conditioning duct 14 of the aircraft system carrier element 10 is connected to an aircraft air conditioning system and swept by air supplied by the aircraft air conditioning system, the coating applied to the inner surface of the air conditioning duct prevents a disturbance of the air flow through the air conditioning duct 14. The coating applied to the inner surface of the air conditioning duct 14 moreover seals the air conditioning duct 14, this being particularly advantageous if the basic body 12 of the aircraft system carrier element 10 is made of a porous foam material.

Figure 4:
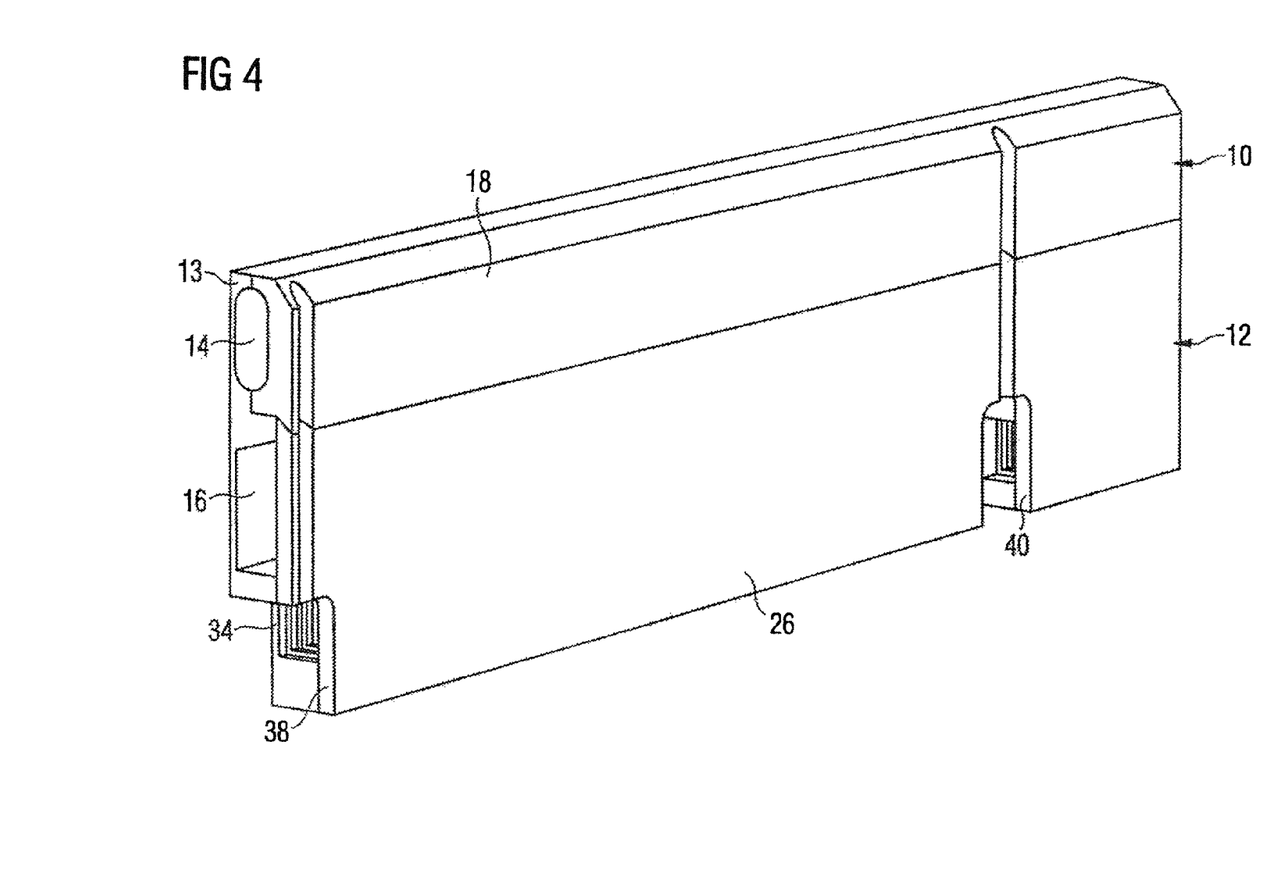
Figure 5:
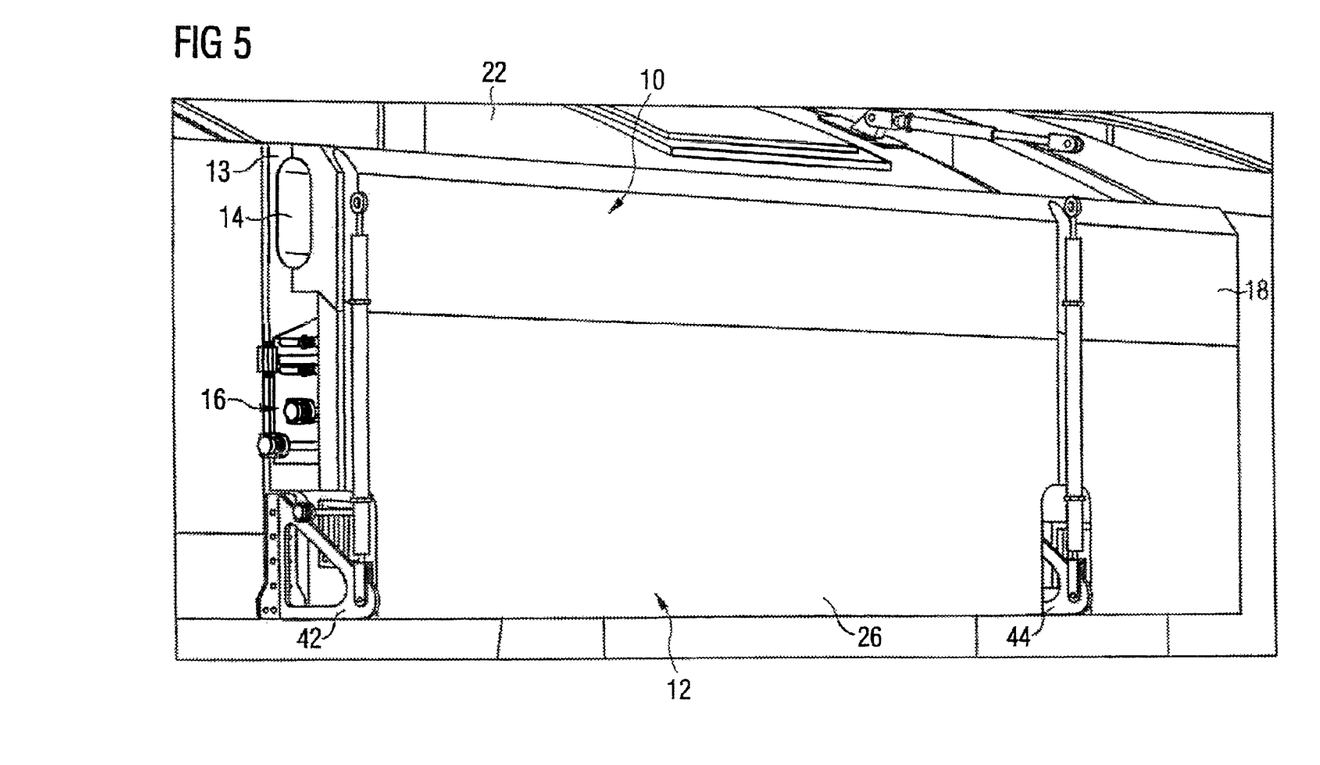

In the line duct 16 formed in the basic body 12 a series of lines 20, such as for example electric lines and oxygen lines, are installed. The lines 20 are used, like the air conditioning duct 14, to supply an aircraft compartment 22. As may be seen in FIGS. 1 to 3, a plurality of receivers 24 are disposed in the line duct 16. The receivers 24 are used to mount line-fastening devices (not shown in the figures) for installing the lines 20 at a desired distance from one another in the line duct 16. The line duct 16 is closed by means of a line duct cover 26 that is fastened detachably to the rear wall 13 (see FIGS. 4 to 6). The lines 20 installed in the line duct 16 are therefore well protected against environmental effects. For maintenance purposes the lines 20 are however easily accessible as a result of the detachable fastening of the line duct cover 26.

As already mentioned, the air conditioning duct 14 as well as the lines 20 led through the line duct 16 are used to supply the aircraft compartment 22. For this purpose the air conditioning duct 14 is connected to a conditioned-air inlet opening (not shown in the figures) that is formed in an aircraft compartment wall. The lines 20 led through the line duct 16 are connected to corresponding consumers disposed in the aircraft compartment 22. For connection of the lines 20 to the consumers disposed in the interior of the aircraft compartment 22, the lines 20 are led out of the aircraft system carrier element 10 through leadthroughs (not shown in the figures) that are formed in the rear wall 13 of the basic body 12 in the region of the line duct 16. In the mounted state of the aircraft system carrier element 10 on an aircraft compartment wall, the leadthroughs formed in the rear wall 13 of the basic body 12 of the aircraft system carrier element 10 are flush with corresponding leadthroughs in the aircraft compartment wall.

Figure 1:
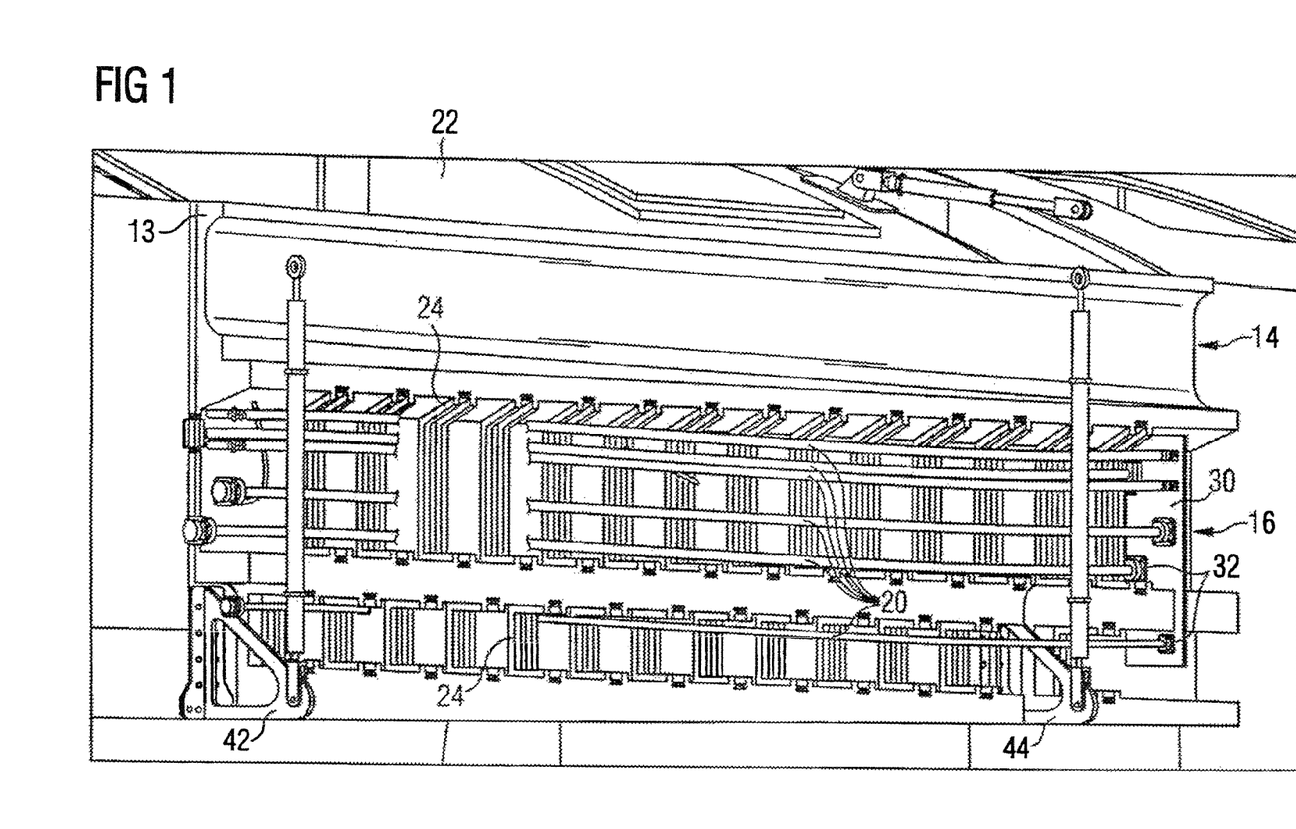
Figure 2:
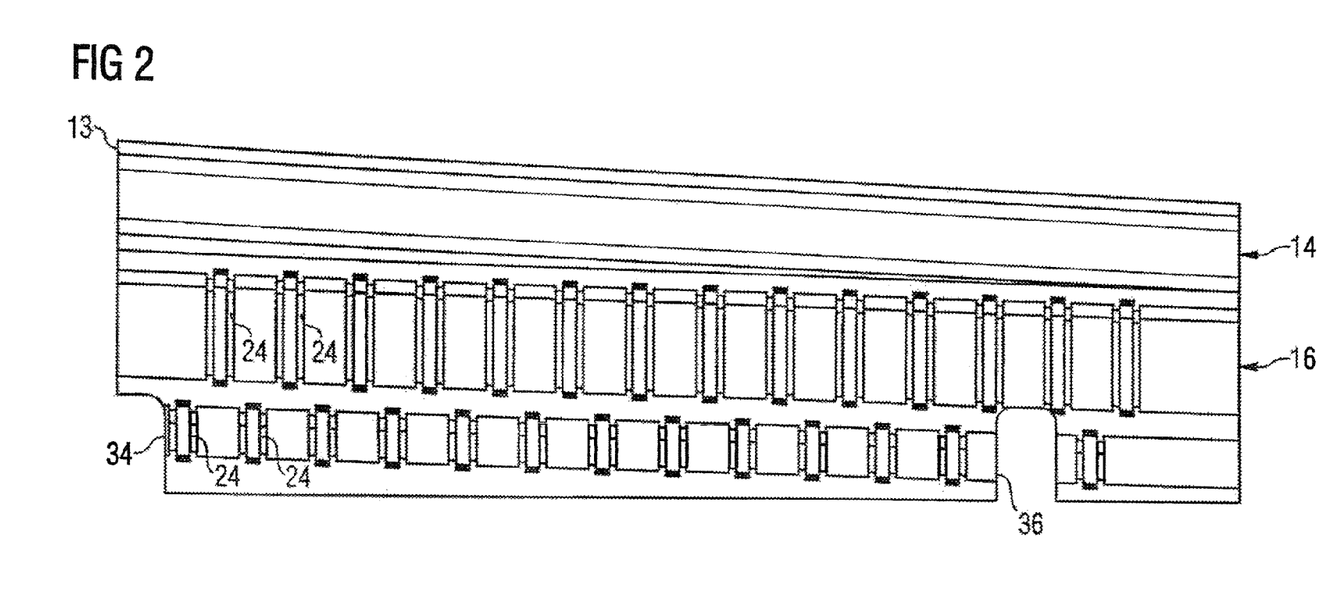
Figure 3:
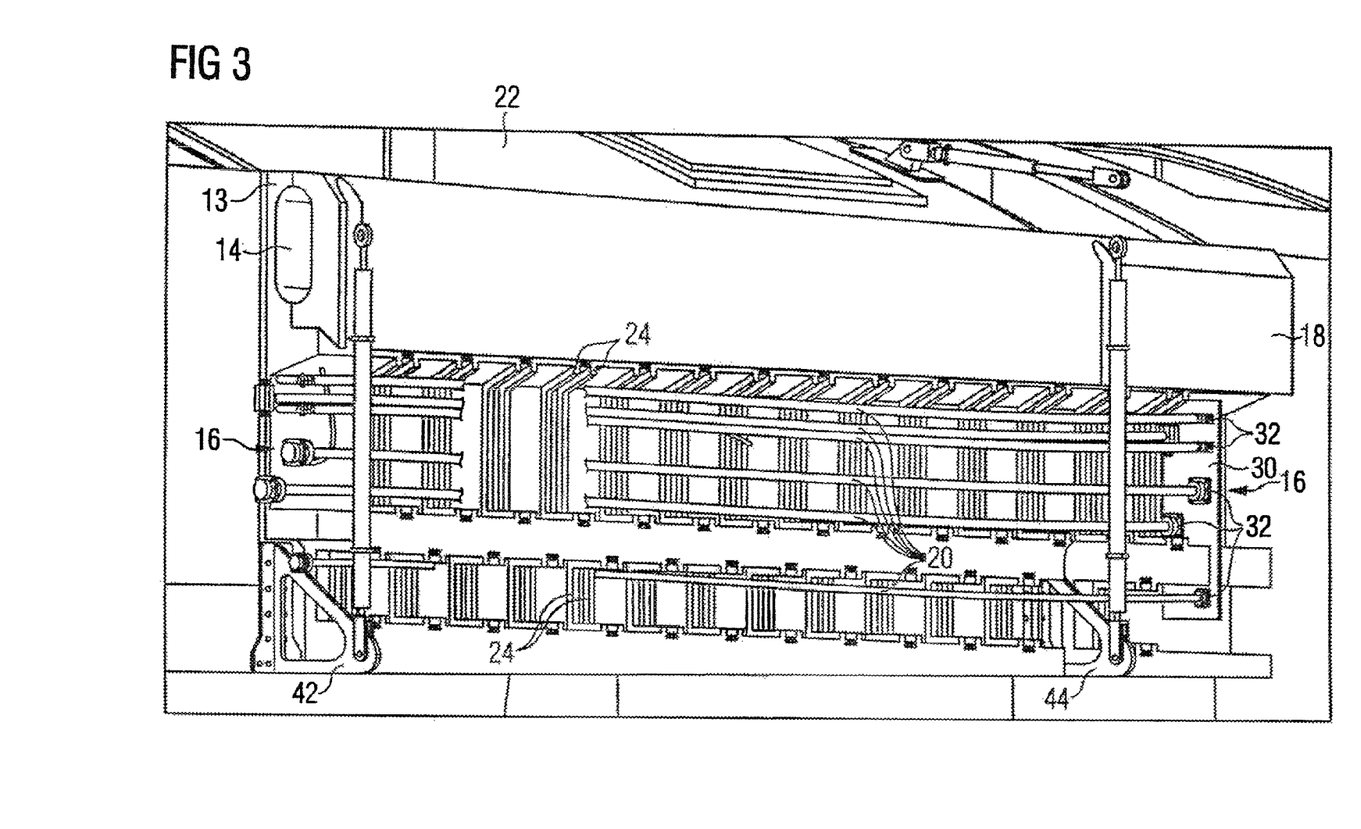
Figure 6:
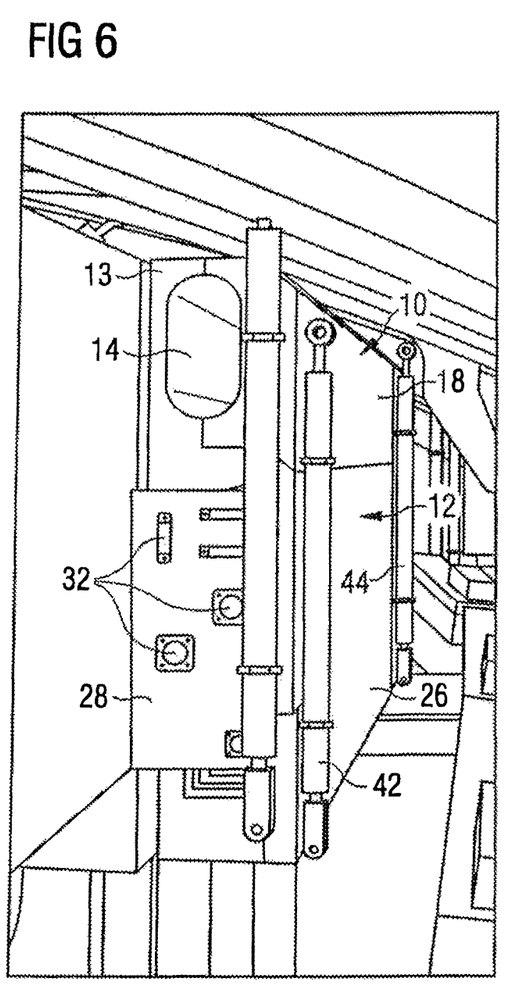

As is evident in particular from FIGS. 1, 3 and 6, the aircraft system carrier element 10 further comprises two side walls 28, 30, which are connected to the basic body 12 in the region of the line duct 16 and hence laterally close the line duct 16. In the side walls 28, 30 corresponding leadthroughs 32 are provided for leading the lines 20 into the line duct 16 and/or out of the line duct 16.

The aircraft system carrier element 10 extends over a large area along a wall of the aircraft compartment 22 and therefore provides optimum sound- and heat insulation of the aircraft compartment 22. It is therefore possible to dispense with additional sound- and heat insulation of the aircraft compartment 22.

In order not to impede fastening of the aircraft compartment 22 to an aircraft structure, the basic body 12 of the aircraft system carrier element 10 is provided with cutouts 34, 36, 38, 40 which, in the mounted state of the aircraft system carrier element 10 on the aircraft compartment wall, receive appropriate holders 42, 44 for fastening the aircraft compartment 22 to the aircraft structure. First cutouts 34, 36 are formed in the rear wall 13 of the basic body 12. Second cutouts 38, 40, on the other hand, extend in the line duct cover 26 and the air-conditioning duct cover 18 and comprise in each case a portion that fully penetrates the line duct cover 26 as well as a portion in the form of a recess formed in the line duct cover 26 and the air-conditioning duct cover 18.

The invention claimed is:

1. An aircraft system carrier element, comprising:
   a basic body made of a sound- and heat-insulating material, in which are formed:
      an air conditioning duct, which is connectable to an aircraft air conditioning system and provided for supplying an aircraft compartment, and
      a line duct for receiving lines that are provided for supplying the aircraft compartment,
   wherein the basic body comprises a rear wall;
   a line duct cover that is fastened detachably to the rear wall;
   a first cutout formed in the rear wall at a portion of the rear wall adjacent to the line duct; and
   a second cutout extending through the line duct cover, the second cutout aligned with the first cutout formed in the rear wall such that the first and second cutouts are configured to collectively receive a holder extending through the first and second cutouts for fastening a wall of the aircraft compartment to an aircraft structure.

2. The aircraft system carrier element according to claim 1, wherein the basic body is made of a sound- and heat-insulating foam.

3. The aircraft system carrier element according to claim 1, wherein the basic body comprises an air-conditioning duct cover that is glueable to the rear wall.

4. The aircraft system carrier element of claim 3, wherein the second cutout further includes a recess extending through a portion of the line duct cover and further extending from the line duct cover through a portion of the air-conditioning duct cover to further form the recess, such that the recess extends continuously along the line duct cover and the air-conditioning duct cover and in a direction transverse to an axis extending through where the first and second cutouts are aligned.

5. The aircraft system carrier element according to claim 1, wherein in the rear wall of the basic body at least one leadthrough is formed in the region of the line duct for leading a line provided for supplying the aircraft compartment out of the aircraft system carrier element into the aircraft compartment.

6. The aircraft system carrier element according to claim 1, wherein the air conditioning duct has an inner surface with a surface-machined and/or coated inner surface having a predetermined surface roughness, and the predetermined surface roughness is configured to prevent the inner surface from disturbing air flowing over the inner surface.

7. The aircraft system carrier element according to claim 1, wherein in the line duct a plurality of receivers are disposed for mounting line-fastening devices in the line duct.

8. The aircraft system carrier element according to claim 1, further comprising:
   a side wall, which is connected to the basic body in the region of the line duct and provided with appropriate leadthroughs for leading the lines provided for supplying the aircraft compartment into the line duct and/or out of the line duct.

9. The aircraft system carrier element according to claim 1, wherein the size and the shape of the aircraft system carrier element are adapted to be mounted to an aircraft compartment wall.

\* \* \* \* \*